E. H. FOSTER.
SPINNING AND ANALOGOUS MACHINE.
APPLICATION FILED NOV. 13, 1913.

1,149,121.

Patented Aug. 3, 1915.

E. H. FOSTER.
SPINNING AND ANALOGOUS MACHINE.
APPLICATION FILED NOV. 13, 1913.

1,149,121.

Patented Aug. 3, 1915.
7 SHEETS—SHEET 6.

Witnesses
Norris L. Sumby.

Inventor
Edward H. Foster
by James L. Norris
Attorney

E. H. FOSTER.
SPINNING AND ANALOGOUS MACHINE.
APPLICATION FILED NOV. 13, 1913.

1,149,121.

Patented Aug. 3, 1915.
7 SHEETS—SHEET 7.

Witnesses

Norris L. Sumby.

Inventor
Edward H. Foster

James L. Norris
Attorney

UNITED STATES PATENT OFFICE.

EDWARD HORNBY FOSTER, OF QUEENSBURY, BRADFORD, ENGLAND.

SPINNING AND ANALOGOUS MACHINE.

1,149,121.  Specification of Letters Patent.  Patented Aug. 3, 1915.

Application filed November 13, 1913. Serial No. 800,815.

*To all whom it may concern:*

Be it known that I, EDWARD HORNBY FOSTER, a subject of the King of Great Britain, residing at Queensbury, Bradford, in the county of York, England, have invented certain new and useful Improvements Relating to Spinning and Analogous Machines, of which the following is a specification.

This invention relates to spinning and analogous machines, more particularly to doffing mechanism therefor, and it has for primary object an arrangement whereby existing spinning and like frames may be provided with mechanical doffing means without necessitating structural alterations and consequently without impairing the rigidity of the frames or the stability of the spindles.

The invention also has for object to effect certain improvements in the mechanism whereby in so far as flier spinning frames are concerned the liability of the yarns or threads to become detached from the fliers during the doffing operation is eliminated.

According to the invention, the doffing elements, that is to say, the means for removing the fliers or caps, as the case may be, and the means for the reception of the full and empty bobbins respectively, are mounted upon a frame or carriage which is adapted to be attached to the front of the spinning machine and which is arranged so as to be traveled vertically of same. The spindle rail is not traveled in order to effect removal or replacement of the bobbins but the bobbins are moved relatively to the spindles by means of the lifter-plate.

The aforesaid frame or carriage is carried at the upper extremities of vertical pillars passing through guides which may be bolted to the main frame of the machine and said carriage, or the pillars, is, or are, connected by suitable means for raising and lowering same. Upon said carriage there are mounted a series of angularly movable "wires" or bobbin-setters for the reception of empty bobbins, a series of holders to remove the fliers or caps, as the case may be, from the spindles, a series of carrier devices for the transfer of full bobbins which devices are provided with automatically operating retaining and releasing means for the bobbins thereupon, and a series of pegs for the reception of the full bobbins from off the transfer carrier devices.

The series of holders and the series of transfer carrier devices are adapted to be reciprocated, independently in horizontal planes in order that each may be positioned to perform the requisite functions, and in the case of a flier spinning frame the flier holders are combined with means for the reception of the eyes of the fliers so as to prevent disengagement of the thread therefrom.

The aforesaid carrier devices serving to transfer the full bobbins from the spindles may consist of a series of pegs which take into the bores of the bobbins as they are removed from the spindles, or, instead of pegs, the devices may consist of clips which are adapted to grip the full bobbins externally.

The accompanying drawings illustrate by way of example the application of the invention to a flier spinning machine of a known and usual type.

Figure 1:
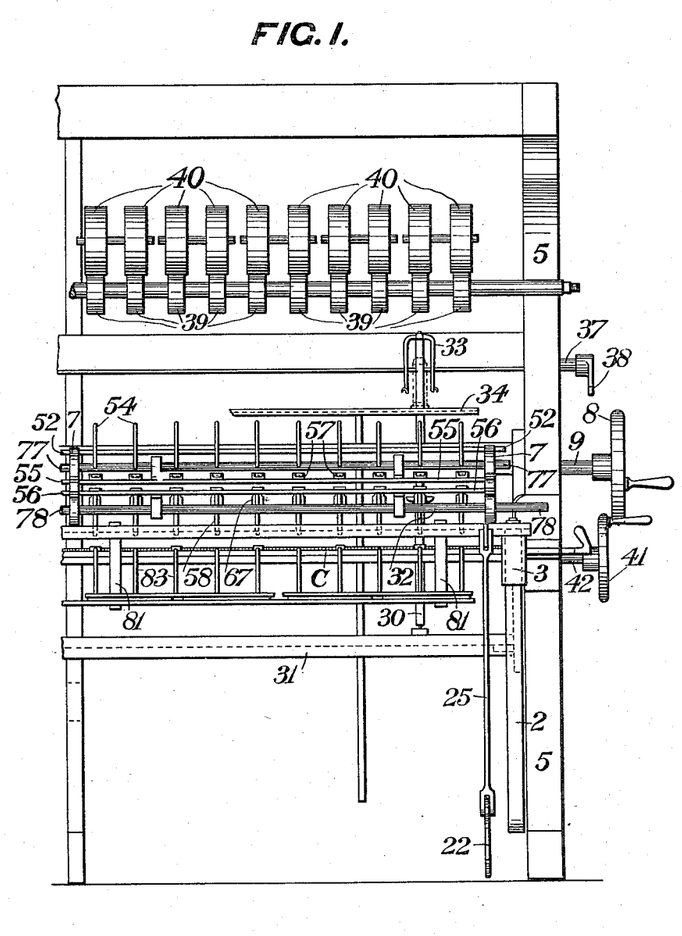
Figure 1 is a front elevation of a portion of the machine taken at say, the right hand end of same, only one spindle being shown complete.
Figure 2:
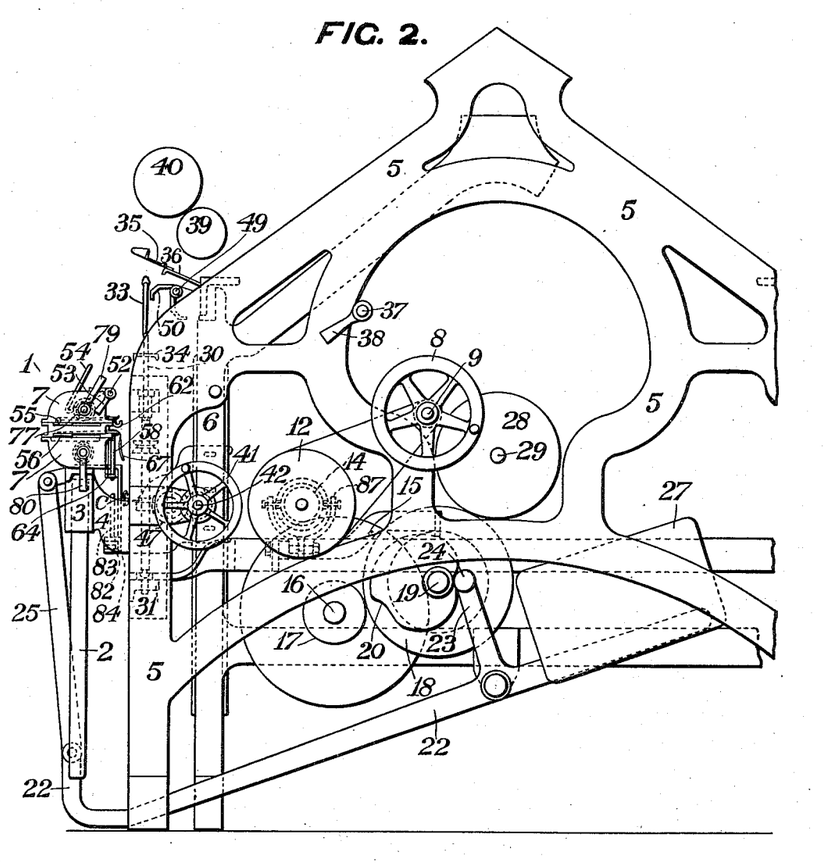
Fig. 2 is an end elevation of the same end of the machine the mechanism at one side only of the machine being shown.

Referring to Figs. 1 and 2, 1 is a carriage mounted at the upper ends of vertical pillars 2 which are adapted to slide in suitably shaped guides 3 each carried by a bracket 4 bolted to the endstand 5 and to intermediate frame members 6. In Fig. 2 the bracket 4 is not shown bolted to the endstand as in Fig. 1 but is omitted for the sake of clearness.

The bottom of the carriage 1 consists of a rail running longitudinally of the front of the machine and to this rail are secured end plates and intermediate plates 7 which serve to carry in bearings the several shafts or rods which are employed for the manipulation of the doffing elements.

The carriage 1 is adapted to be traveled vertically in front of the spindles, and to this end it is connected to mechanism for operating same. This mechanism may consist, when the operation is to be effected manually, of a handwheel 8 mounted upon a shaft 9 upon which a sprocket wheel 10 is keyed, which sprocket wheel is connected by a chain 11 to a sprocket wheel 12 carried by a shaft 13 upon which shaft a pinion 14 is also keyed. This pinion 14 meshes with a pinion 15 carried by a shaft 16 upon which is also mounted a pinion 17 which meshes with a pinion 18 keyed upon a cam shaft 19 provided with a cam 20.

Mounted upon a rock shaft 21 at the bottom of the frame of the machine is a lever 22 having integral therewith an upwardly extending arm 23 at the extremity of which is a freely rotating roller 24 adapted to contact with the periphery of the cam 20.

The forward extremity of the lever 22 is bent upwardly and is coupled to the carriage 1 by means of a connecting link 25 pivoted at its lower end to said lever 22 and at its upper end to a short link 26 which is in turn pivoted to the underside of the carriage 1.

The rock shaft 21 extends along the entire length of the machine and the connections between the carriage and same may be multiplied as may be demanded by the length of the machine.

At its inner or rear extremity the lever 22 carries a balance weight 27 to counterbalance the carriage 1 in its upward and downward travel.

28 is the usual "tin cylinder" for the driving tapes and it is mounted upon the shaft 29 which is adapted to be rotated by means of the usual driving mechanism.

In the normal operation of the machine, shaft 29 is the driving shaft to which is attached the usual mechanism for operating the lifter plate 34 referred to below.

30 are the spindles which are mounted in bearings carried by the fixed foot rail 31, each spindle 30 being provided with the usual whirl 32 and with a flier 33 which is adapted to screw on to the upper end of the spindle.

34 is the lifter plate which functions in the usual manner and which is also utilized for the purpose of removing the full bobbins from the spindles in a manner hereinafter described.

35 is the thread board which is hinged to the beam 36 and is adapted to be raised by means of cords or wires (not shown) connecting same to a shaft 37 having an operating lever 38, for the purpose of providing room for the doffing elements when raised to their uppermost position as explained hereafter.

39 and 40 are the usual drawing-down rolls.

Before the doffing takes place all the fliers 33 must be positioned squarely of the front of the machine in order that when the holders to remove same are operated the fliers may be all arranged symmetrically and capable of being seized, and in addition to this all the fliers must be unscrewed from the spindles. For this purpose means are provided for rotating the spindles and means are also provided for holding the fliers against rotation at the same time.

Figure 14:
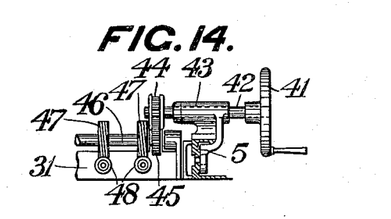
Fig. 14 is a detail view of mechanism for rotating the spindles manually.

The means for rotating the spindles are illustrated in detail in Fig. 14; and comprise a hand wheel 41 carried by a short shaft 42 mounted in a bearing 43 bolted to the endstand 5, said shaft 42 having keyed to it a pinion 44 meshing with a pinion 45 keyed to a shaft 46 which extends the entire length of the machine behind the spindles 30, and which has secured upon it, in rear of each spindle 30, a skew gear wheel 47 which meshes with a corresponding gear wheel 48 formed on or attached to the spindle 30.

The means for positioning all the fliers 33 and for holding same against rotation when the spindles 30 are turned comprise a horizontal rock shaft 49 carried in suitable bearings upon the frame of the machine and having fixed to it a number of fingers 50 each of which is adapted to be moved angularly into the path of rotation of its corresponding flier by the rock-shaft 49 being turned by means of an operating handle 51 thereon.

The means for effecting the removal of the full bobbins from the spindles and the substitution therefor of a supply of empty bobbins will now be described.

Figures 10, 11, 12, 13:
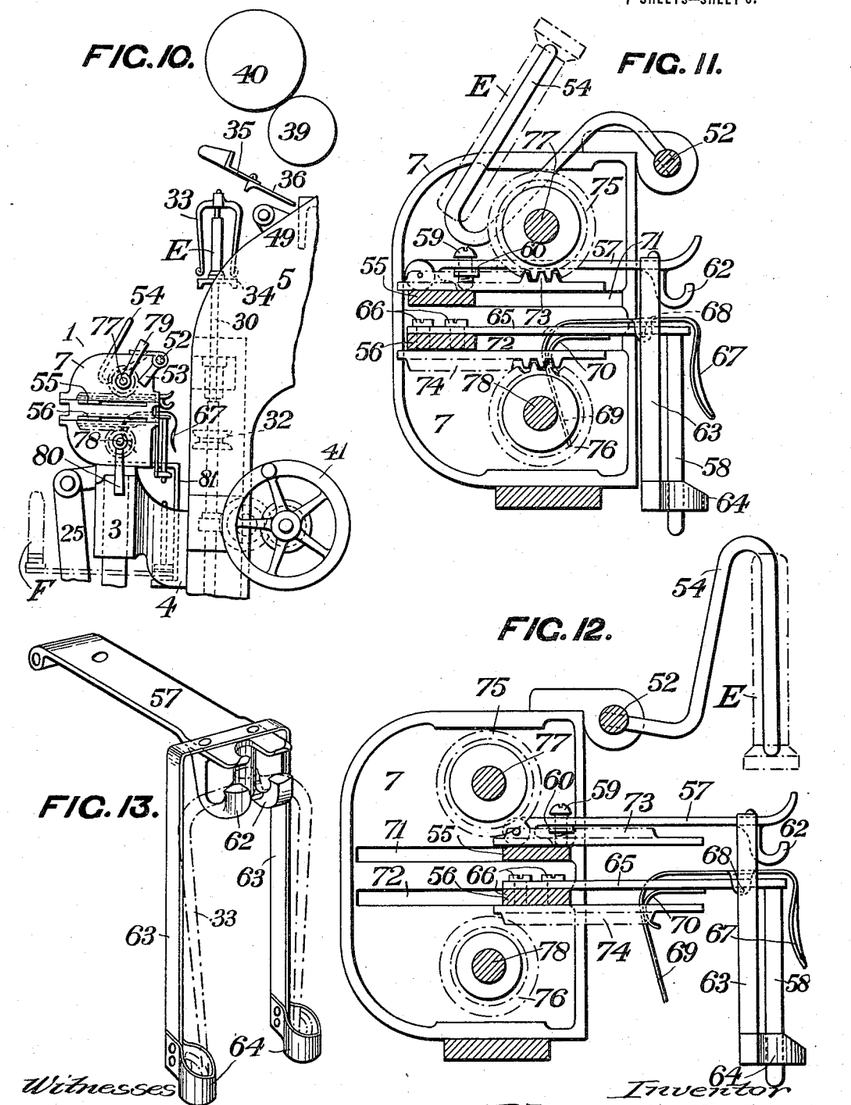
Fig. 11 is a sectional elevation showing the doffing elements in the normally retracted or inoperative position.
Fig. 12 is a similar elevation showing the same elements in the forward or operative position; it being understood however that all these elements are not positioned simultaneously as shown in the figure.
Fig. 13 is a front elevation of a flier holder which may be employed, and which is also included in the other views.

The carriage 1 has arranged upon it, in suitable bearings, a longitudinal rod or shaft 52 which is capable of being moved angularly by means of a hand wheel 53, lever or the like, and which is fitted with a series of "wires" 54 or bobbin setters of known form, one opposite each spindle, which "wires" are adapted to be moved angularly and positioned axially over the spindles 30 to place thereon a series of empty bobbins, the carriage 1 being raised to a convenient height for this purpose as explained hereafter. Also arranged upon said carriage 1 are two longitudinal bars 55, 56 (see especially Figs. 11 and 12), parallel with one another, whereof the upper bar 55 has attached to it a series of holders 57 for the fliers 33, and the lower bar 56 has attached to it a series of transfer bobbin-pegs 58 to receive full bobbins from off the spindles 30.

The flier holders 57 are pivoted to the bar 55 and project horizontally toward the spindles; each being provided with an adjusting screw 59 bearing on the bar 55 and a locknut 60, and each holder 57 is formed at its forward extremity with a bifurcation 61 (see Fig. 13) to receive the neck of the flier 33 and with a pair of hook-shaped lugs 62, 62, depending below said bifurcated forward extremity to receive and retain the top bar of the flier. Further, each flier holder 57 may be provided at its forward extremity with an attachment depending below same and comprising an inverted U-shaped member 63 whereof the lower extremity of each limb is fashioned with a "boot" or ring 64 to receive the "eyes" of the flier when the latter is in place on the holder, said "boots" or rings being preferably lined with felt or other analogous resilient material.

The transfer bobbin pegs 58 are attached by their upper ends to forwardly projecting plates or fingers 65 secured by screws 66, 66, to a bar 56, and each of said pegs 58 is provided with a self-acting clip 67 hinged or otherwise attached at 68 thereto and whereby the bobbin is retained thereon, each of said clips 67 being fashioned with a depending trigger portion 69 controlled by a spring 70 so as to cause the clip 67 to grip the bobbin against the peg 58.

The ends of the bars 55, 56 are supported in grooves or slots 71, 72, respectively formed in the end plates 7 and said bars are respectively provided with rack surfaces 73 and 74 engaged respectively by pinions 75, and 76 mounted upon shafts 77 and 78 carrying operating hand levers 79 and 80 whereby said bars are traveled to project the holders 57 and the pegs 58 toward the fliers 33 and spindles 30 and to retract same therefrom.

Below the carriage 1, and attached thereto, by means of hangers 81 or to the pillars 2 supporting same, is a longitudinal bar 82 carrying a row of upstanding receiver pegs 83 destined to receive the full bobbins when the latter are released by the clips 67 from the transfer pegs 58; or instead of being carried by a continuous bar 82 groups of say twelve pegs 83 may be carried by independent lengths of such bar, as shown, each of which lengths (or the whole bar if continuous) is connected to the carriage 1 or its other supporting means by a parallel linkage 84 as will be well understood without special illustration, whereby the receiver pegs 83 with the full bobbins thereon may be drawn outwardly of the carriage and of the doffing elements thereon, thus admitting of the unobstructed removal of the full bobbins by hand from off said pegs.

The normal position of the carriage 1 during the operation of spinning is some distance below the level of the fliers 33, and during said spinning operation a series of empty bobbins are placed by hand upon the angularly movable bobbin setters or "wires" 54 in readiness to be placed on to the spindles 30 when the full bobbins have been removed therefrom.

Figure 17:
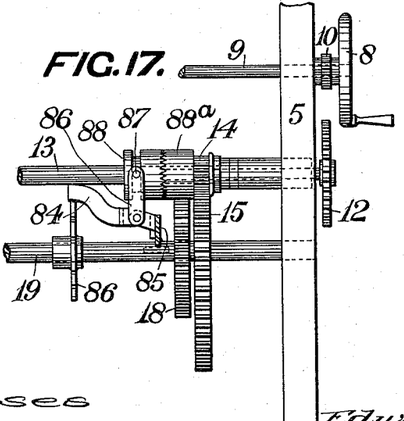
Fig. 17 is a front elevation of the mechanism for raising and lowering the carriage carrying the doffing elements.

During the operation of doffing, the carriage 1 is caused automatically to assume the requisite vertical position which corresponds with the particular step in the operation to be performed, by means of the following mechanism: A lever 84 is pivoted to a cross member 85 of the main frame of the machine, and the free end of this lever engages with a slotted disk 86 which is keyed upon the shaft 19 (see Figs. 1 and 17). This lever 84 is connected by means of a link 86 to a clutch for 87 which engages one member 88 of a serrated or dog clutch, said member 88 being mounted so as to rotate with and to slide freely on the shaft 13 upon which shaft the other member 88ª of the clutch is keyed fast. A foot pedal (not shown) is provided in order to disengage the lever 84 from the disk 86 when required.

Figure 15:
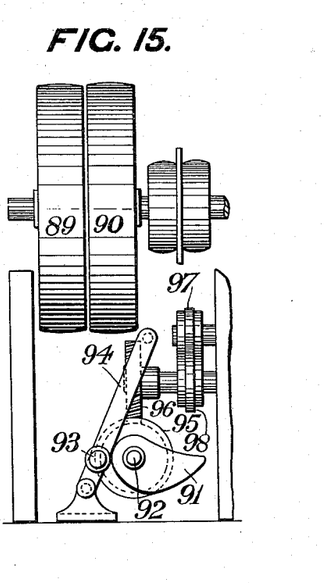
Fig. 15 is a side elevation showing the drive to the lifter plate.
Figure 16:
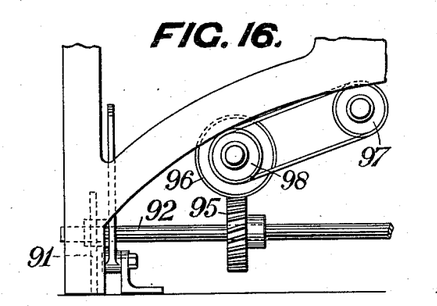
Fig. 16 is a front elevation of same with certain parts omitted.

Referring to Figs. 15 and 16, 89 and 90 are the fast and loose main driving pulleys, below which in Fig. 15 is shown the mechanism for communicating the larger up and down motion to the lifter plate 34 required, besides the usual mechanism for providing the usual up and down motion. This mechanism consists of the usual cam 91 carried by a shaft 92 and contacting with a roller 93 on a pivoted arm 94 whereof the upper end is connected as usual by a chain to the lifter plate, which, because of its length, does not interfere with the normal up and down operation of the lifter plate 34 from the shaft 29. The shaft 92 is driven by means of skew gear 95, 96 actuated by chain and sprocket mechanism 97, 98 from shaft 19. When the machine is in normal operation, the whole of the driving mechanism for shaft 19 is out of operation.

Instead of the hand wheel 8 on the shaft 9, the said shaft may be power driven by means of suitably controlled connections from the loose pulley 90.

Figure 3:
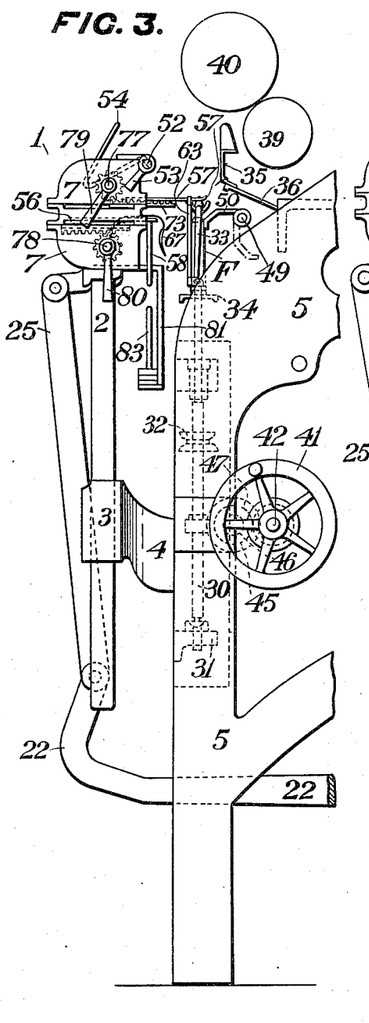
Figs. 3 to 10 inclusive are all end elevations of so much of the end-stand as is necessary to illustrate the spindle and the doffing elements, and these figures show the positions occupied by the several parts during the successive stages of the doffing operation.
Figure 4:
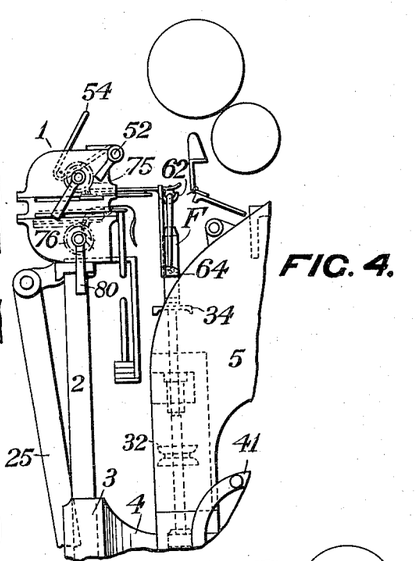
Figure 5:
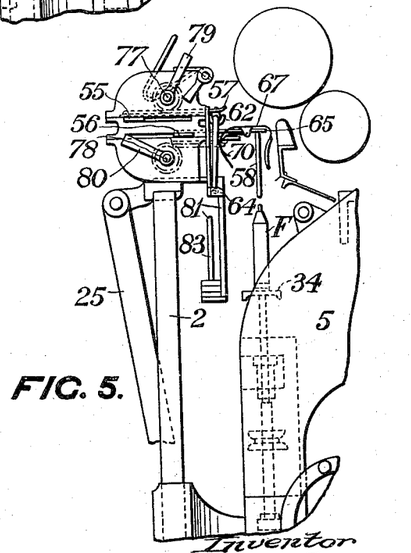
Figure 6:
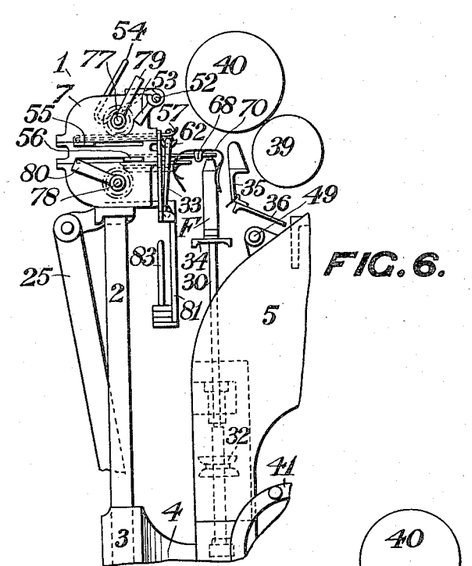
Figure 7:
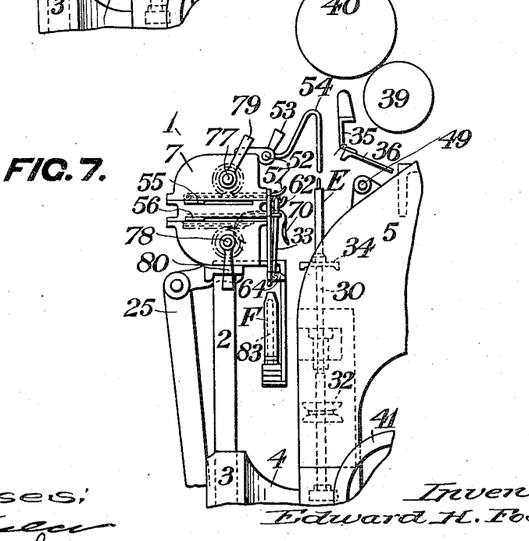
Figures 8, 9:
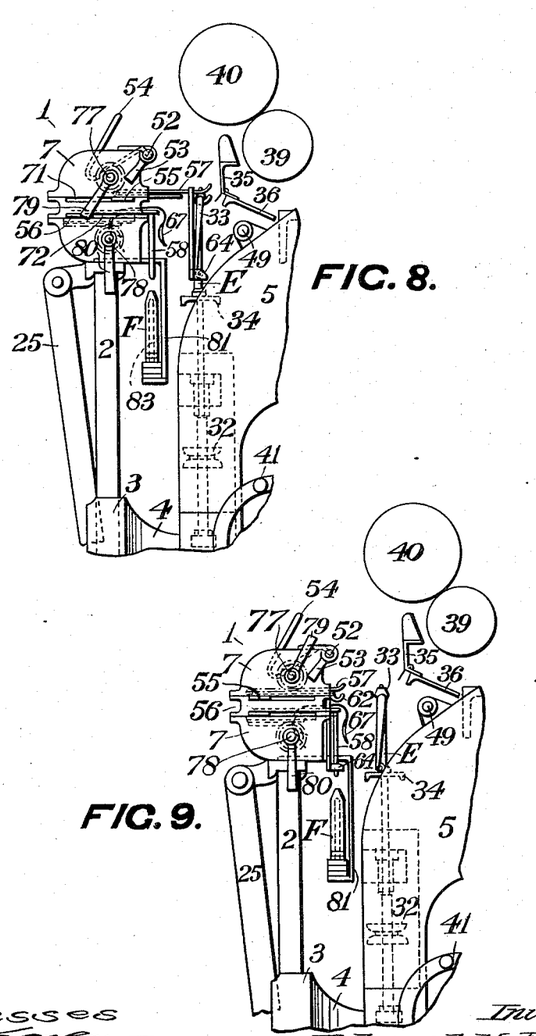

The operation of the apparatus during the process of doffing will now be described. Assuming that the series of bobbins upon the spindles 30 are completely filled with thread and are therefore in a condition to be doffed, the machine is stopped by throwing the driving belt over from the pulley 89 to the pulley 90 in the usual manner, and the hinged front portion of the thread board 35 is raised angularly upward (as in Figs. 3 to 9) by turning hand lever 38 and shaft 37, thus removing any obstruction which the thread board might offer to the raising of the carriage 1 and the doffing elements thereon. Having removed the belt from the driving pulley 89 the spindles 30 are free to be turned by hand to position all the fliers 33 and to unscrew same from the spindles; and this is done by turning shaft 49 by means of handwheel 51 so as to raise the fingers 50 angularly upward into the position indicated by dot-and-dash lines in Fig. 2, when they are then projected into the paths of rotation of their respective fliers 33. The spindles 30 are then rotated by turning the hand wheel 41 (see Figs. 2 and 14) which through shaft 42 and gearing 44, 45, 46, 47 and 48 imparts rotary motion to said spindles and causes all the fliers 33 to be arrested by the projecting fingers 50 and thereby to become unscrewed from the spindles. When not in use, the hand-wheel is disconnected by moving the shafts 42 and 46 in an endwise direction, thereby disengaging the worm wheels 47 from the worms 48, the motion of the shaft 46 for this purpose being communicated from the shaft 42 by the shrouded gear wheel 44 which coöperates with the gear 45. When the fliers have thus been unscrewed and are resting freely upon the plain upper portions of the spindles, the fingers 50 are lowered and the carriage 1 is raised into its first position to bring all the bifurcated flier holders 57 to a point level with and in front of the top bars of the fliers. This raising of the carriage 1 is effected by turning hand wheel 8 and shaft 9 the rotary motion of which is transmitted by the chain and sprocket mechanism 10, 11, 12 to the train of gearing 14, 15, 17 and 18 and thereby to the shaft 19 and the slotted disk 86; the carriage being arrested automatically on arriving at the correct height by the lever 84 engaging with the appropriate slot on the periphery of the disk 86 and the upward travel of the carriage being caused by the rotation of the cam 20 the configuration of the periphery of which causes the arm 23 and hence also the lever 22 to be moved angularly and the link 25 to be moved upwardly. The passing of the lever 84 into the slotted disk causes the clutch member 88 to be disengaged from the clutch member 88ᵃ and the carriage is thus operatively disconnected for the time being. Upon the arrival of the carriage 1 at said first position the flier holders 57 are advanced until their bifurcated front extremities engage the fliers (as in Fig. 3), such advancing of said flier holders being effected by turning shaft 77 by hand lever 79 causing the rack and pinion mechanism 73, 75 to travel the bar 55 toward the spindles. If desired the operation of unscrewing the fliers can be delayed until after the fliers have been seized. When the fliers 33 have thus been engaged by the flier holders the carriage has to be raised still farther to remove the fliers from off the spindles and before this can be done the lever 84 has to be disengaged from the slotted disk 86 by means of the foot pedal, already referred to but not shown, so as to reëngage the clutch members 88 and 88ᵃ. A few turns of the hand wheel 8 then brings the carriage 1 to its second position, where it is automatically arrested as before, and when the bobbin pegs 58 are sufficiently high to enable them to be advanced into position co-axially with and above the tops of the spindles 30. As the carriage 1 is being raised, the fliers 33 are engaged by the hook-shaped lugs 62, 62, on the flier holders and the eye of each flier enters the corresponding felt lined "boot" or ring 64 on the member 63 in which said eye is retained in such a manner that the thread cannot become disengaged therefrom during the further manipulation of the fliers. Fig. 4 shows the carriage raised sufficiently to carry the fliers 33 clear of the tops of the spindles, after which the bar 55 is retracted, carrying the fliers back also into the position shown in Fig. 5 which figure also shows the bobbin pegs 58 in place above the tops of the spindles. The bobbin pegs 58 are advanced toward and over the spindles by turning shaft 78 by means of hand lever 80 causing the bar 56 to be slid toward the spindles by means of the rack and pinion mechanism 74, and 76. The hand wheel 8 is then turned until another slot on the disk 86 is entered by the lever 84, during which rotation of the hand wheel 8 the reëntrant portion of the cam 20 or that portion of the periphery which is of lesser radius than the remainder is engaging the roller 24 on arm 23 to which arm therefore no angular movement is imparted and the carriage is consequently stationary. The turning of the shaft 19, however, rotates the lifter cam 91 through gearing 95, 96, 97 and 98, raising the lifter plate 34 and in consequence because of its greater throw, over the normal and usual operation of the mechanism controlling the lifter plate, sliding the full bobbins F upwardly of the spindles 30 and off same on to the bobbin pegs 58 as shown in Fig. 6. As each full bobbin F approaches the upper end of the peg 58 it engages the hinged clip 57 which it forces outward and whereby it is securely held by pressure against its periphery. The bar 56 is then retracted to its original position by the operating hand lever 80, in which position the pegs 58 are coaxially above the receiver pegs 83, and shortly before the limit of the backward movement of said bar 56 is reached the spring controlled depending trigger portion 69 of each clip 57 abuts against the rock shaft 78 causing the pressure of the clips 57 upon the full bobbins F to be released automatically and permitting said full bobbins to slide off the pegs 58 on to the receiver pegs 83 below, as shown in Fig. 7. The lifter plate 34 is then lowered by reversing the operation already described for raising it, and the carriage 1 is also lowered until again arrested by the lever 84 and disk 86, in which position the "wires" or bobbin setters 54 may be moved angularly toward and into co-axial alinement with the tops of the spindles. As already stated, these "wires" or bobbin setters 54 carry a supply of empty bobbins E, and they are positioned over the spindles 30 by turning the rockshaft 52 toward the spindles by means of hand lever 53 so that the empty bobbins E slide freely off the "wires" 54 on to the spindles 30. The carriage 1 is then adjusted to a height suitable to allow the fliers 33 to be replaced over the spindles 30 which is effected by reversing the operation already described for removing the fliers. Fig. 8 shows the fliers advanced once more above the spindles on which they are then replaced and after the holders 57 have been withdrawn into the position shown in Fig. 9 the fliers are screwed on by once more raising the fingers 50 and turning the spindles. The carriage 1 is then once more adjusted to a suitable height to enable a few turns of the thread to be placed on to the empty bobbins E which is effected by continuing to turn the hand wheel 41; and the threads extending between the empty bobbins E and the full bobbins F are then severed by an angularly movable cutter bar C of known form. After the threads have been severed the carriage 1 is lowered to the normal position of rest, the thread board is lowered into position (see Fig. 10) and the machine is re-started. The groups of receiver pegs 83 are then drawn out by their parallel linkages into the position shown in dotted lines in Fig. 10 and the full bobbins are collected, empty bobbins being placed by the operator at the same time on the "wires" or bobbin-setters 54.

It will be manifest that but slight modifications are required in order to adapt the above described doffing mechanism to other types of spinning frames, such for example as cap spinning frames or others, without in any way affecting the fundamental principles of the invention; the description and illustration of the invention as applied to a flier spinning frame having been selected merely by way of example. It will also be obvious that owing to the special design and simplicity of operation of the mechanism it can be adapted with great facility to existing spinning frames without necessitating structural alterations of any importance and without impairing the rigidity of the frames or the stability of the spindles.

What I claim is:—

1. A doffing mechanism for spinning and analogous machines comprising a vertically movable, horizontally reciprocating, non-revoluble doffing carriage having doffing elements which include a non-revoluble holder and a revoluble bobbin setter means, and additional means to operate said doffing elements wholly from said carriage.

2. A doffing mechanism for spinning and analogous machines comprising a vertically movable non-revoluble doffing carriage having doffing elements which include a non-revoluble flier holder and a revoluble bobbin setter means, and means on the holder for protecting the thread of a flier while being doffed.

3. In combination with a doffing and a lifter plate mechanism, means for operating the lifter plate by steps, and automatic means for locking the lifter plate means after having reached a full step, and releasing means for the operating means to enable the lifter plate to travel another step.

4. In combination with a doffing carriage and lifter plate mechanisms, means for operating said mechanisms simultaneously by steps, and automatic means for arresting and locking the step movement of the operating means, and releasing means.

5. In combination with a doffing carriage, a lifter plate means, means to simultaneously actuate the carriage and the lifter plate means, and automatic locking means, and a releasing means for causing the carriage and the lifter plate to travel by distinct steps.

6. In combination with a doffing mechanism, means to actuate said mechanism, automatic means for arresting and locking said actuating means after a partial actuation, and releasing means to enable the whole operation to be performed by distinct steps.

7. An attachment to spinning and analogous machines comprising a doffing carriage having a vertical travel, doffing means on said carriage, a lifter plate actuating means and a doffing carriage actuating means, means for simultaneously controlling said last two means, an automatic locking means to arrest said controlling means, and a releasing means to enable said controlling means to perform its function by steps.

In testimony whereof I have hereunto set my hand in presence of two subscribing witnesses.

EDWARD HORNBY FOSTER.

Witnesses:
 JOHN JAMES EARNSHAW,
 JOHN ARTHUR MIDGLEY.